United States Patent [19]
Sendelweck

[11] Patent Number: 4,991,003
[45] Date of Patent: Feb. 5, 1991

[54] RECEIVER WITH CORRECTION FOR COMB FILTER FREQUENCY RESPONSE

[75] Inventor: Gene K. Sendelweck, Indianapolis, Ind.

[73] Assignee: RCA Licensing Corporation, Princeton, N.J.

[21] Appl. No.: 341,017

[22] Filed: Apr. 20, 1989

[51] Int. Cl.$^5$ .............................................. H04N 9/64
[52] U.S. Cl. ........................................ 358/35; 358/31; 358/38
[58] Field of Search ........................ 358/31, 35, 38, 39

[56] References Cited

U.S. PATENT DOCUMENTS 3,728,476  4/1973  Bates et al. .............................. 358/31
4,677,462  6/1987  Bell ......................................... 358/31

OTHER PUBLICATIONS

"CTC 148/149 Service Data" pub. by Thompson Consumer Electronics Inc, Indianapolis, Ind., 1988, Schematic 2-1.

Primary Examiner—James J. Groody
Assistant Examiner—David E. Harvey
Attorney, Agent, or Firm—Joseph S. Tripoli; Peter M. Emanuel; Richard G. Coalter

[57] ABSTRACT

A video source is coupled to a display processor by a circuit path including a comb filter and a luminance signal delay line and including a comb filter amplitude correction circuit. Circuit means in the path prevents impedance variations of the correction circuit from causing reflections in the delay line thereby preventing image blur due to such reflections. In a preferred embodiment this feature is provided using existing receiver circuitry thereby providing the further technical and economic advantage of improved reliability and providing a cost reduction.

3 Claims, 6 Drawing Sheets

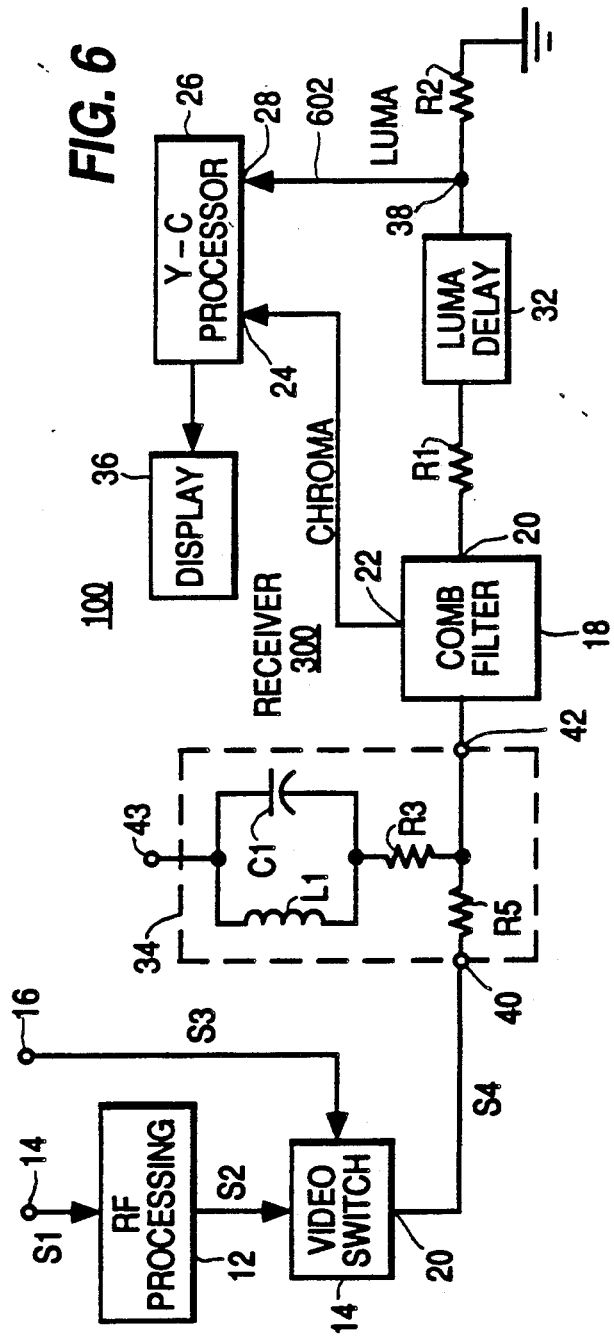

RECEIVER WITH CORRECTION FOR COMB FILTER FREQUENCY RESPONSE

FIELD OF THE INVENTION

This invention relates to television receivers of the type employing comb filters for providing luminance and chrominance signal separation and particularly to receivers in which the comb filter exhibits a non-uniform amplitude response with frequency and in which a compensation circuit is provided for reducing the response variations.

BACKGROUND OF THE INVENTION

The advantages of using a comb filter for providing luminance and chrominance signal separation in a television receiver are quite well known. A conventional comb filter includes a delay device for imparting a one horizontal line (1-H) delay to the video input signal, an adder for adding the delayed and non-delayed input signals to provide a luminance output signal and a subtractor for subtracting the delayed and non-delayed signals to provide a chrominance output signal.

The delay element used in a comb filter has a very significant effect on the comb filter frequency response characteristic. The ideal delay element would have a constant delay independent of frequency thereby providing a linear phase response and thus a uniform amplitude response throughout the video frequency band to be filtered. The delay element presently closest to this ideal is the digital delay line employing binary storage elements. Unfortunately, digital delay lines are costly and relatively complex because video signals are conventionally received in analog form and so conversion to digital form is necessary to use digital delay lines of the binary storage type.

Analog delay elements, such as glass delay lines, are conventionally used in comb filters as a means of reducing the cost and complexity of the filter. Comb filters employing glass delay elements (or other analog delay elements) are however subject to delay variations with frequency (i.e., non-linear phase response) and thus the overall amplitude response of such comb filters tends to vary with frequency.

Manufacturers of comb filters of the glass delay line type have recognized this problem and have taken steps to correct for undesired amplitude variations which, to a certain extent, minimizes the problem. As an example, amplitude response 2 of FIG. 2 (PRIOR ART) herein illustrates the uncorrected response of a commercially available comb filter employing a glass delay line. As shown, the uncorrected response exhibits a rising response from about 2.5 MHz to 4.5 MHz with a peak of about +6 dB. The manufacture of this filter has included a correction circuit having the characteristic shown by response 3. The resultant corrected response is illustrated by curve 4. As seen the amplitude corrected comb filtered signal (4) exhibits a dip of about 2 dB at a frequency of about 2.5 MHz, it returns to zero dB at about 3 MHz and decreases thereafter. As shown, the rather large 6 dB variation of the uncorrected comb filter has been reduced to only 2 dB by internal correction circuits provided by the manufacturer (TDK Incorporated, model HCF0020C).

The comb filter correction (to 2 dB) provided by the filter manufacturer is quite good considering the rather large (+6 dB) variations typical of uncompensated comb filters with glass delay lines. It has been recognized by the present inventor, however, that it would be desirable to provide a further correction of the comb filter response to reduce the luminance signal variations to a few tenths of a decibel in the luminance frequency range. To this end the present inventor has previously designed a receiver in which an auxiliary luminance amplitude correction circuit was included which achieved this goal. This receiver has been manufactured and sold under the brand name "RCA" in receivers employing chassis identification numbers CTC 148/149 and is shown herein as FIG. 1 (PRIOR ART). An understanding of this prior art receiver (10) is helpful to appreciating the subtle nature of the present invention and so this receiver will now be described in detail.

Receiver 10 includes an RF processor 12 having an antenna or cable input terminal 14 for receiving an RF video input signal S1. Processor 12 includes conventional elements such as a tuner for selecting channels, an IF amplifier and sound trap and a video detector for providing a demodulated (baseband) composite video output signal S2 at its output. A video switch 14 is provided for selecting signal S2 or an auxiliary composite video baseband signal S3 applied to an auxiliary input terminal 16. The selected signal S4 provided by video switch 14 is applied to a comb filter 18 of the type employing an analog type delay element (e.g., a glass delay line). The filter 18 exhibits uncompensated amplitude variations as a function of frequency and has a luminance signal output 20 for providing a luminance output signal Y1 and a chrominance signal output 22 for providing a chrominance output signal C1.

The chrominance signal C1 is applied to a first input 24 of a luminance-chrominance (Y-C) processor 26. The luminance signal Y1 is applied to a second (luminance) input 28 of processor 26 by means of a cascade connection comprising, in the exact order named of: a contrast control 30, a luminance/chrominance delay correction circuit 32 having source (R1) and termination (R2) resistors and a comb filter correction circuit 34 (outlined in phantom).

The function of contrast control 30 is to control the peak-to-peak amplitude of the comb filtered luminance signal. In the prior art receiver this control is provided by a 300 Ohm potentiometer coupled in series with a 430 Ohm resistor, the latter serving as a minimum limit to the potentiometer output. The function of luma delay 32 is to delay the comb filtered luminance signal by about 300 nano-seconds. This compensates for difference in luminance and chrominance signal delay in the receiver due to their different bandwidths and thus provides proper registration of the luminance and chrominance signals for display on display 36. The function of the comb filter correction circuit 34 is to correct uncompensated errors in the amplitude response of comb filter 18. This correction is shown in FIG. 2 by curve 5 which has a +2 dB peak at a frequency of about 2.5 MHz. As a result the uncorrected comb filter output (response 4) is flattened to the response 6 which is essentially constant up to a frequency of about 4.2 MHz, the full extent of the luma band in the NTSC standard. Processor 26 includes conventional circuits for providing functions such as chroma demodulation, hue and saturation control and matrixing for providing a suitable output regional (e.g., RGB) for display by display unit 36.

The correction circuit 34 (outlined in phantom) comprises an input 40 connected to the output 38 of luma delay unit 32 (e.g., 300 nanoseconds) and an output 42 connected to input 28 of processor 26. Internally unit 34 includes a parallel resonant circuit comprising an inductor L1 and a capacitor C1 connected in common to terminals 40 and 42 at one end thereof and coupled to ground at the other end thereof by means of a resistor R3. Representative values for L1, C1 and R3 are 100 micro-Henrys, 39 pico-Farads and 8200 Ohms, respectively. This circuit provides the luma signal boost of about 2 dB shown in FIG. 2 as response 5 which flattens the overall response 6 to within less than 1 dB over the full luma band as shown.

SUMMARY OF THE INVENTION

It is herein recognized that the substantial improvements in comb filter performance provided by the present inventor in the design of the prior art receiver of FIG. 1 can be improved to an even higher standard of performance. Specifically, it has been discovered that slight image blurring may occur in the PRIOR ART example of FIG. 1.

The present invention resides in: (1) discovery of the existence of the problem of image distortion in the prior art receiver, (2) discovery of the cause of the problem and (3) discovery of solutions which are both technically effective and cost effective.

The cause of this problem has been found, in accordance with the present invention, to be related to the specific point in the prior art receiver 10 where the luminance signal amplitude correction circuit 34 is connected. In particular, the connection of circuit 34 has been discovered to cause reflections in delay line 32. The visual effect of these reflections or "ringing" is to create double images or ghosts of very short displacement relative to the main image and thus may be manifested visually as image blur.

In accordance with another aspect of the invention, the technical reason that delay line 32 exhibits ringing is two fold. Specifically, the delay correction circuit 34 exhibits a frequency dependent impedance variation because the impedance of elements L1 and C1 changes with frequency. The luminance delay circuit 32, however, is a conventional analog delay line and so is sensitive to variations in impedance of its source and load elements. With circuit 34 directly connected to the load resistor R2 of delay line 32 the effective load impedance thus varies with frequency thereby causing frequency dependent load variations for delay line 32.

In accordance with an aspect of the invention the receiver is provided with circuit means for preventing impedance variations of the comb filter correction circuit from causing reflections in the luma delay line. A number of examples using isolation amplifiers are given herein for providing substantially constant source and termination impedances for the luminance delay line to prevent the reflections.

In a preferred application of the principles of the invention, the reflections are prevented utilizing existing receiver components thus eliminating the need for an isolation amplifier.

The cost effectiveness of the preferred embodiment is readily apparent, Additionally, there is a technical advantage obtained in that by eliminating the need for an active circuit element (isolation amplifier) the reliability of the receiver is enhanced.

In accordance with the preferred embodiment of the present invention, the comb filtered luminance signal amplitude correction is applied between the output of the video source (switch 14) and the input of the receiver comb filter (18).

BRIEF DESCRIPTION OF THE DRAWING

The invention is illustrated in the accompanying drawing wherein like elements are denoted by like reference designators and in which:

FIG. 6 is a diagram in block and schematic form of a preferred embodiment of a television receiver embodying the invention.

DETAILED DESCRIPTION

Figure 1:
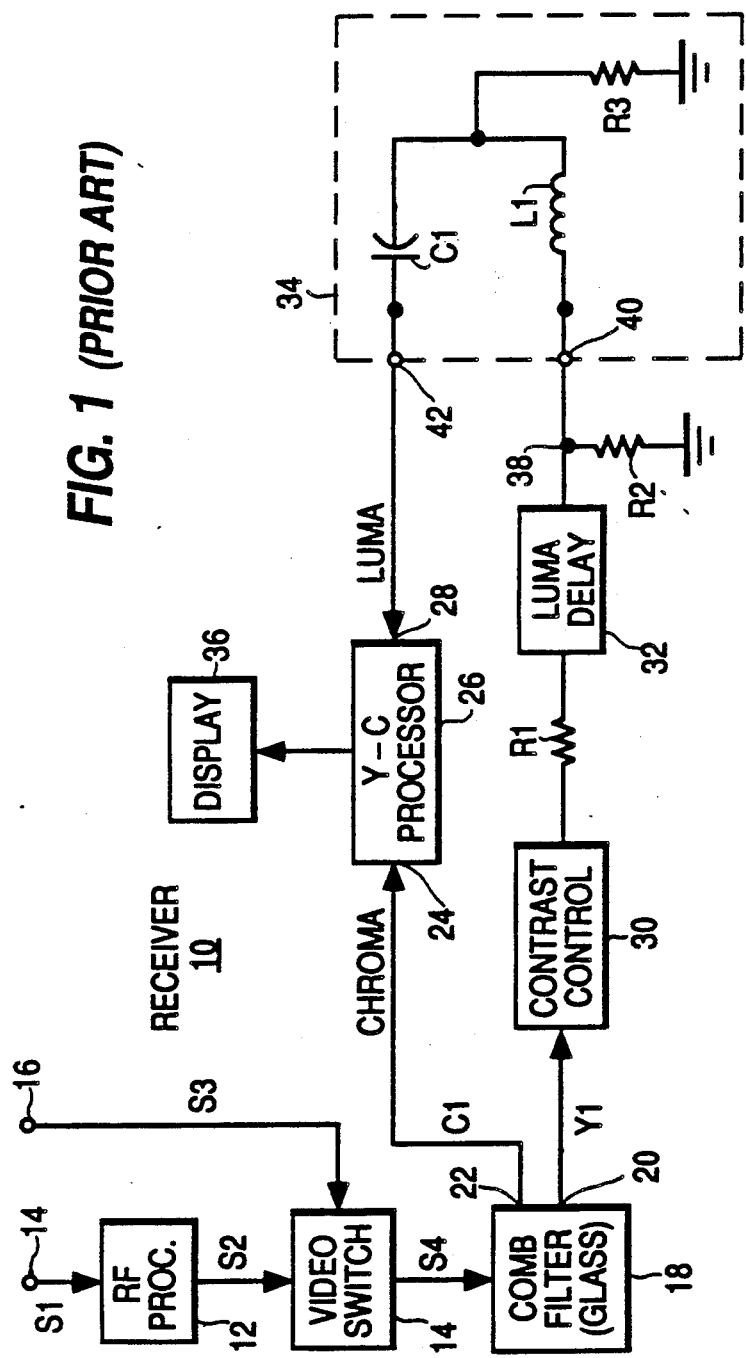
FIG. 1 is a diagram in block and schematic form of a PRIOR ART receiver having correction for the response of a comb filter employing a glass delay line element.
Figure 2:
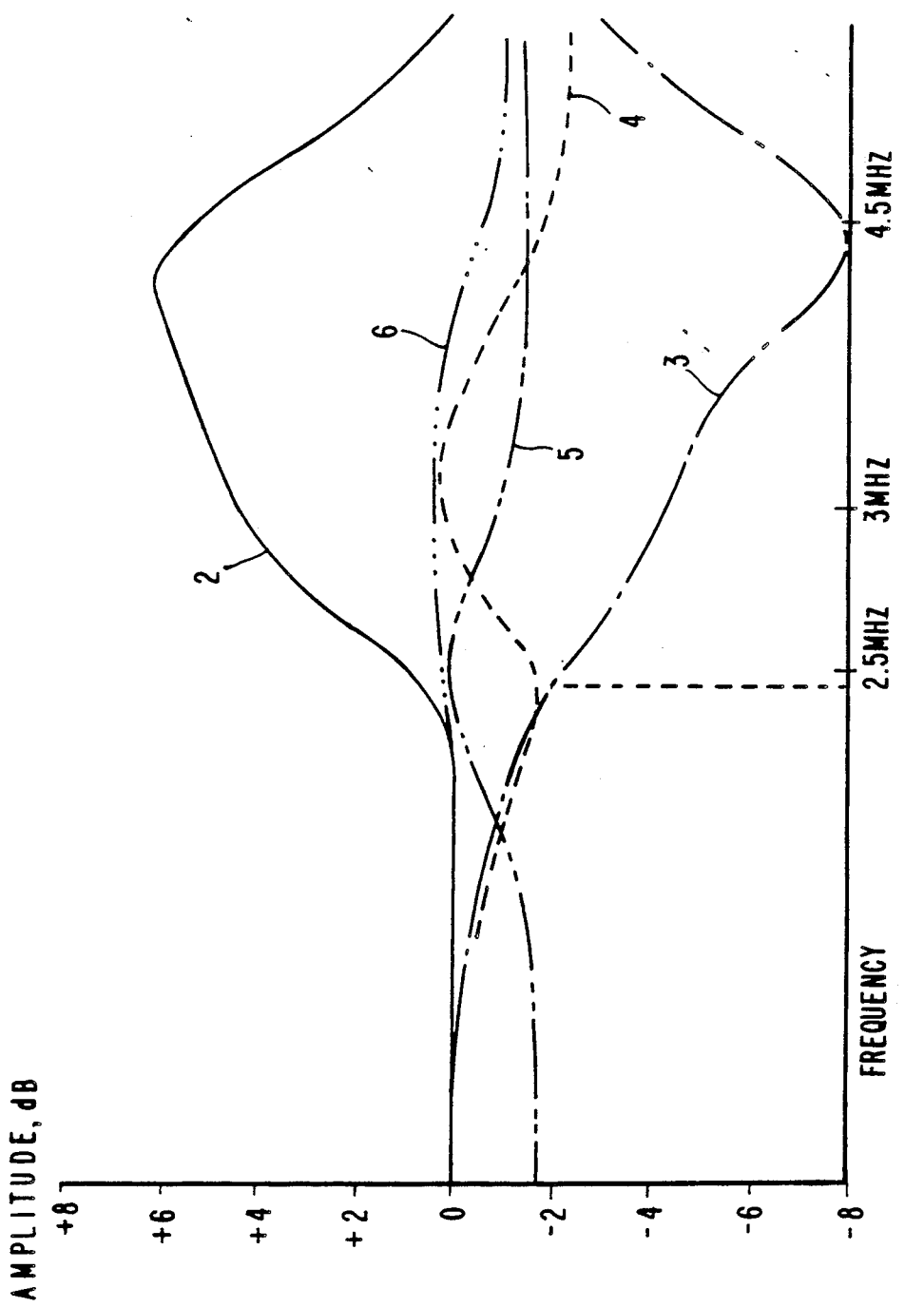
FIG. 2 is a response diagram of a PRIOR ART comb filter employing a glass delay element and illustrates response corrections used by a filter manufacturer and a receiver manufacturer to correct for amplitude errors of the comb filter.

Prior art FIGS. 1 and 2 have been previously discussed in detail.

Figure 3:
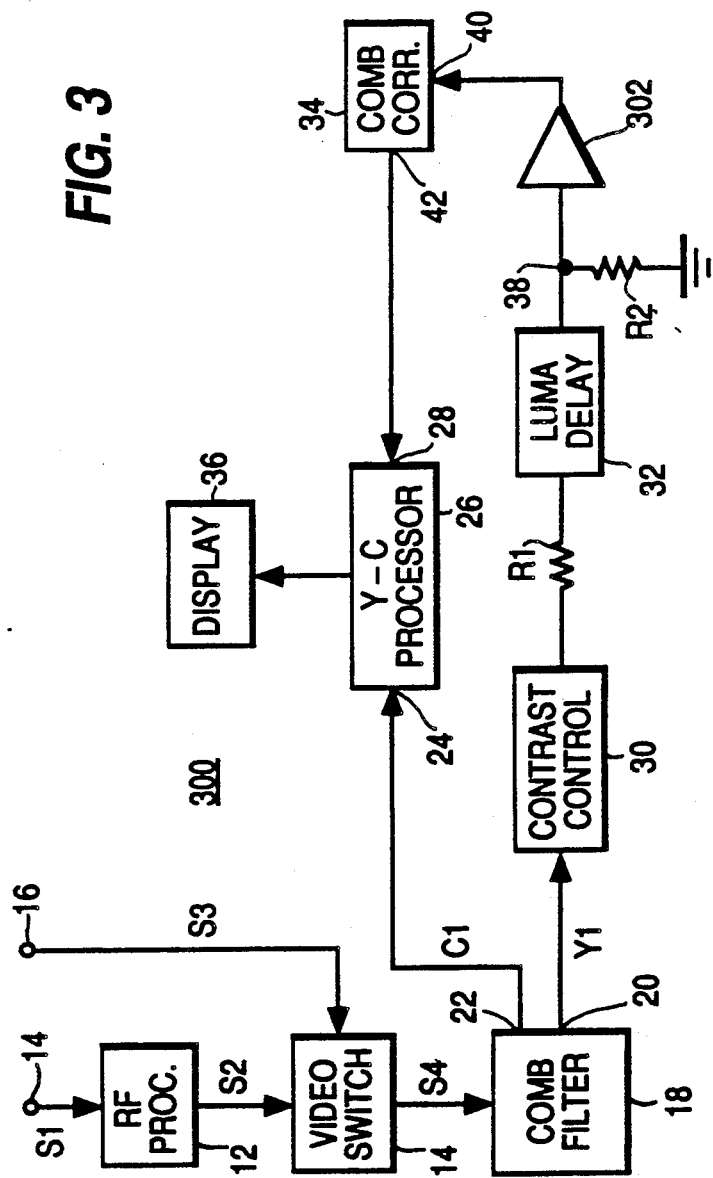
FIGS. 3, 4 and 5 are diagrams in block and schematic form of a television receiver embodying the invention.

The receiver 300 of FIG. 3, embodying the invention is similar to receiver 10 of FIG. 1 but differs in that a buffer or isolation amplifier 302 is interposed in the circuit path (30,32,34) between the output 20 of comb filter 18 and the luminance input 28 of Y-C processor 26. Specifically, in this embodiment the amplifier 302 is connected between the output 38 of luma delay filter 32 and the input 40 of comb filter correction circuit 34. Accordingly, the impedance variations of comb filter correction circuit 34 are effectively isolated from the output of luma delay circuit 32 and thus the effective load impedance for circuit 32 is stabilized. This prevents reflections in line 32 and solves the newly discovered problem with the prior art receiver.

Figure 4:
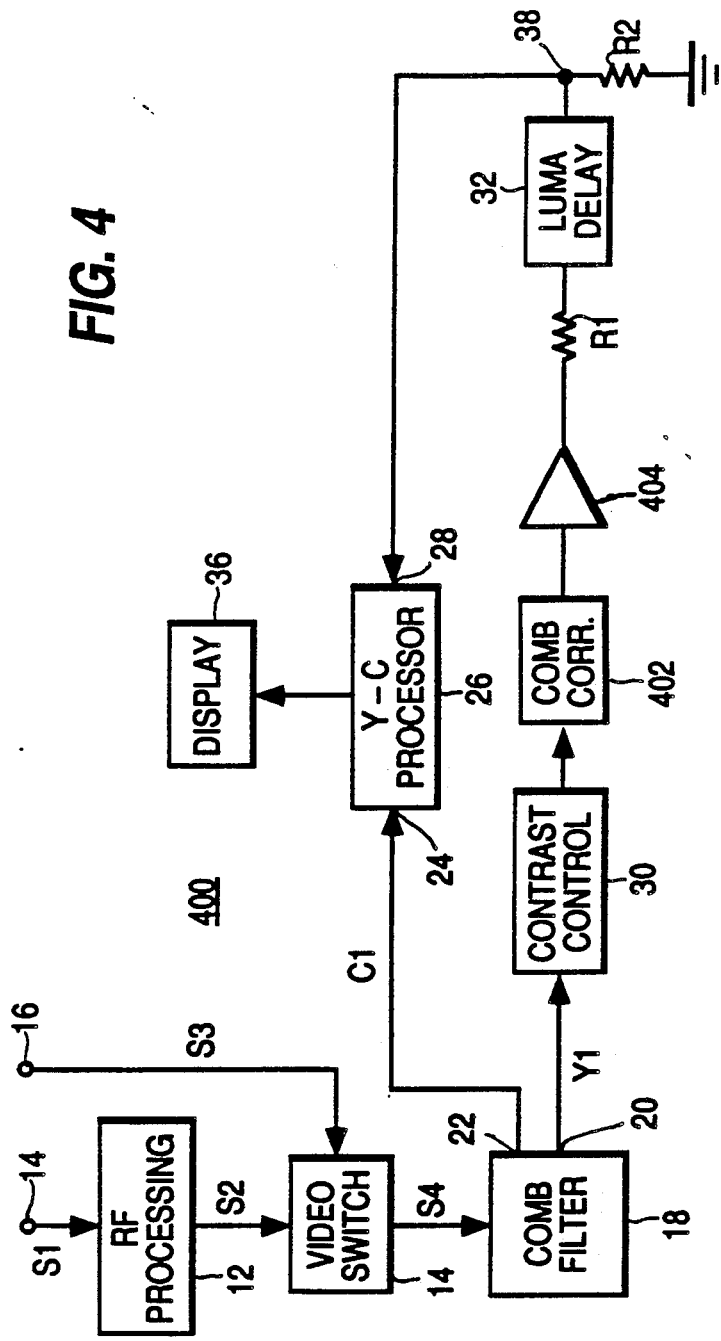

The receiver 400 of FIG. 4, embodying the invention, is similar to receiver 10 of FIG. 1 but differs in three respects. Specifically, (1) the output 38 of luma delay line 32 is connected directly to the input 28 of processor 26 thus stabilizing the termination impedance of delay line 32. To provide comb filter frequency correction, a correction circuit 402 is connected at the output of contrast control 30. To prevent impedance variations of circuit 402 from varying the effective source impedance (R2) of luma delay line 32, an isolation or buffer amplifier 404 is connected between the output of correction circuit 402 and the source resistor R1 for luma delay circuit 32. The connection of load (termination) resistor R2 directly to input 28 of processor 26 eliminates load impedance variations. The use of isolation amplifier 404 prevents source impedance variations. Thus no reflections are produced in delay line 32 by impedance variations of correction circuit 402.

Figure 5:
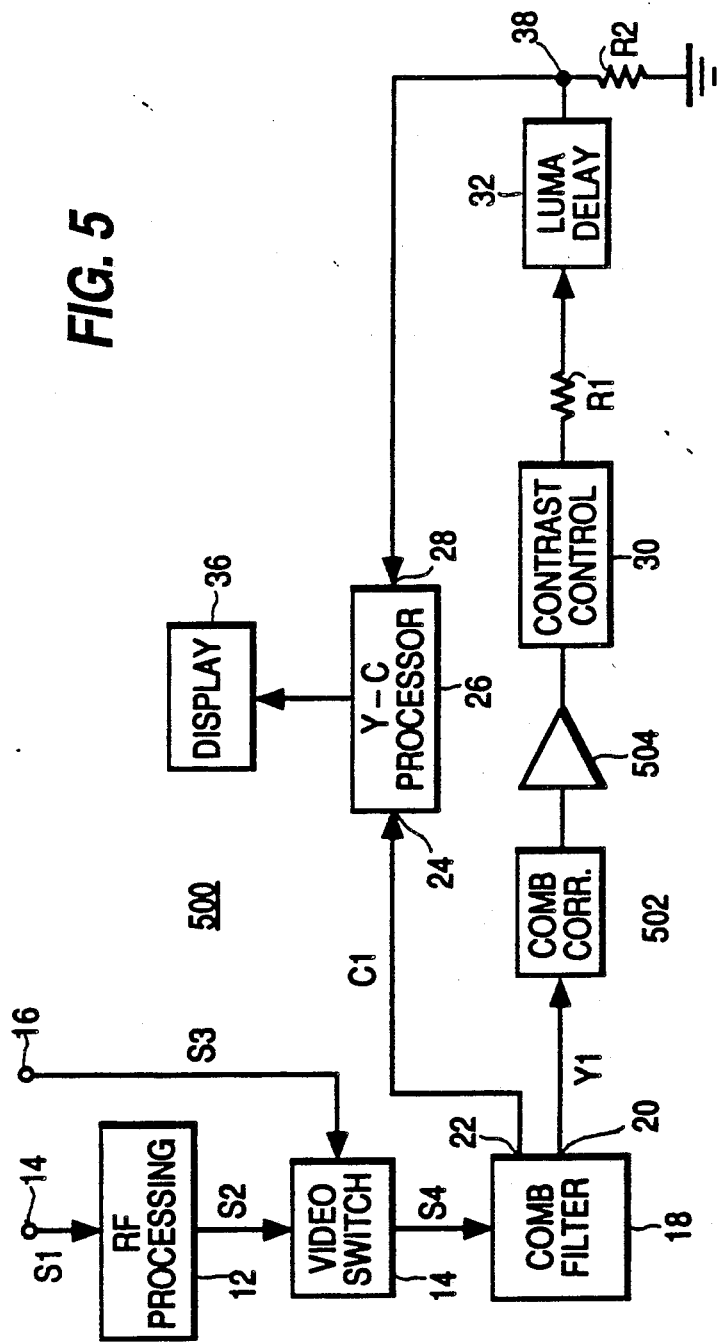

The receiver 500 of FIG. 5 is similar to that of FIG. 4 except that comb filter correction and isolation is provided before contrast control 30. Specifically, the output 38 of delay line 32 is connected directly to the input 28 of Y-C processing unit 26 and a comb filter amplitude correction circuit 502 is connected to the comb filter output 20 and coupled via an isolation amplifier 504 to the input of the contrast control 30.

The output connection of delay line 32 prevents load impedance variations. Comb filter correction is provided by relocating the correction circuit to the comb output 20. Source impedance variations are prevented by isolation amplifier 504. Accordingly, the load and source impedances of line 32 are constant and reflections are thereby suppressed.

The receiver 600 of FIG. 6 is a presently preferred embodiment of the invention. This embodiment of the invention utilizes existing receiver circuits to solve the same newly discovered problem as the embodiments of FIGS. 3, 4 and 5 but this is achieved without requiring the use of an isolation amplifier. As previously explained, this provides two additional advantages of the invention including:

(1) a superior technical effect and
(2) an economic benefit.

The economic benefit obtained by solving a problem using existing circuits without need for an isolation amplifier will be readily apparent to anyone concerned with the manufacture of television receivers. The superior technical effect obtained is an improvement in receiver reliability by elimination of the need for the isolation amplifier. The task of the quality control engineer is thus simplified because there is one less active amplifying component to fail when using the preferred embodiment of the invention.

In detail, in the embodiment of FIG. 6, the comb filter correction circuit is relocated. Specifically, the following changes have been made in the receiver 10 of FIG. 1 to implement receiver 600 of FIG. 6:

(1) the output 38 of luma delay line 32 has been connected directly (by means of connection 602) to the input of Y-C processor 26; and
(2) the comb filter correction circuit 34 has been relocated between the output 20 of video switch 14 and the input of comb filter 18.

More specifically, in this embodiment of the invention the output 20 of video switch 14 is connected to input 40 of comb filter correction circuit 34 the output 42 of which is connected to the input of comb filter 18. By this connection the source and termination impedances of luminance signal delay line 32 are not influenced by impedance variations with frequency of the comb filter correction circuit 34 and thus the image blur problem is solved with the technical and economic advantages noted above. In this new location of circuit 34 exemplary element values of L1, C1 and R3 are 47 micro-Henrys, 82 pico-Farads and 1500 Ohms, respectively. Also a series input resistor R5 (e.g., 390 Ohms) has been added and the L-C elements L1, C1 are coupled to a supply terminal 43 rather than to ground. The DC path thus provided (L1,R3,R5) advantageously provides DC bias to the input of comb filter 18 which employs an input amplifier biased by the video signal DC input component. Advantageously, the DC bias applied by correction circuit 34 eliminates the need for a separate bias network and blocking capacitor for comb filter 18.

What is claimed is:

1. A television receiver, comprising:
   a source having an output providing a video to be displayed;
   a display having an input for receiving said video signal;
   a circuit path including a comb filter and a delay line connected in the order named between said output of said source and said input of said display; and
   a comb filter correction circuit in said path for correcting amplitude variations of said comb filter, said correction circuit exhibiting frequency dependent impedance variations; wherein:
   said circuit path includes first coupling means coupling said correction circuit between said output of said source and an input of said comb filter and includes second coupling means coupling an output of said delay line to said input of said display for preventing said impedance variations of said comb filter correction circuit from causing reflections in said delay line.

2. A television receiver as recited in claim 1 further comprising:
   a supply terminal and means coupling said terminal filter.

3. A television receiver as recited in claim 2 wherein:
   said correction circuit comprises a first resistor connected in series with an inductor between said supply terminal and said input of said comb filter;
   a capacitor connected in parallel with said inductor; and a second resistor connected between said output of said source and said input of said comb filter.

* * * * *

UNITED STATES PATENT AND TRADEMARK OFFICE
CERTIFICATE OF CORRECTION

PATENT NO.    :    4,991,003

DATED         :    February 5, 1991

INVENTOR(S)   :    Gene K. Sendelweck

It is certified that error appears in the above-identified patent and that said Letters Patent is hereby corrected as shown below:

Column 6, line 36 (Claim 2):  after "said" and before "terminal" insert -- supply --.

Column 6, line 37 (Claim 2):  before "filter." insert -- to said correction circuit for applying a DC bias to said input of said comb --.

Signed and Sealed this

Sixteenth Day of June, 1992

Attest:

DOUGLAS B. COMER

Attesting Officer

Acting Commissioner of Patents and Trademarks